(12) United States Patent
Mahgerefteh et al.

(10) Patent No.: US 10,495,813 B2
(45) Date of Patent: Dec. 3, 2019

(54) ECHELLE GRATING MULTIPLEXER OR DEMULTIPLEXER

(71) Applicant: FINISAR CORPORATION, Sunnyvale, CA (US)

(72) Inventors: Daniel Mahgerefteh, Los Angeles, CA (US); Ying Luo, Sunnyvale, CA (US); Jin-Hyoung Lee, Sunnyvale, CA (US); Shiyun Lin, San Diego, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 16/054,145

(22) Filed: Aug. 3, 2018

(65) Prior Publication Data
US 2019/0041578 A1 Feb. 7, 2019

Related U.S. Application Data

(60) Provisional application No. 62/540,968, filed on Aug. 3, 2017.

(51) Int. Cl.
*G02B 6/12* (2006.01)
*G02B 6/124* (2006.01)

(52) U.S. Cl.
CPC ..... *G02B 6/12007* (2013.01); *G02B 6/12016* (2013.01); *G02B 6/124* (2013.01);
(Continued)

(58) Field of Classification Search
None
See application file for complete search history.

(56) References Cited

U.S. PATENT DOCUMENTS

| 5,706,377 A | * | 1/1998 | Li | G02B 6/12016 |
| | | | | 385/14 |
| 5,889,906 A | * | 3/1999 | Chen | G02B 6/12011 |
| | | | | 385/24 |

(Continued)

FOREIGN PATENT DOCUMENTS

EP 2924482 A1 9/2015

OTHER PUBLICATIONS

Feng, Dazeng, et al., "Fabrication Insensitive Echelle Grating in Silicon-on-Insulator Platform", IEEE Photonics Technology Letters, vol. 23, No. 5, Mar. 1, 2011, pp. 284-286 (3 pages).
(Continued)

*Primary Examiner* — Ellen E Kim
(74) *Attorney, Agent, or Firm* — Maschoff Brennan

(57) ABSTRACT

In one example embodiment, an integrated silicon photonic wavelength division demultiplexer includes an input waveguide, an input port, a plurality of output waveguides, a plurality of output ports, a first auxiliary waveguide, and a plurality of auxiliary waveguides. The input waveguide may be formed in a first layer and having a first effective index n1. The input port may be optically coupled to the input waveguide. The output waveguides may be formed in the first layer and may have the first effective index n1. Each of the output ports may be optically coupled to a corresponding output waveguide. The first auxiliary waveguide may be formed in a second layer below the input waveguide in the first layer. The first auxiliary waveguide may have a second effective index n2 and may have two tapered ends, and n2 may be higher than n1.

22 Claims, 10 Drawing Sheets

(52) U.S. Cl.
CPC ............ *G02B 2006/12061* (2013.01); *G02B 2006/12107* (2013.01); *G02B 2006/12164* (2013.01)

(56) References Cited

U.S. PATENT DOCUMENTS

| | | | |
|---|---|---|---|
| 7,668,416 B2 * | 2/2010 | Li | B82Y 20/00 385/129 |
| 9,164,238 B2 * | 10/2015 | Park | G02B 6/262 |
| 9,507,087 B2 * | 11/2016 | Park | G02B 6/12014 |
| 2002/0176666 A1 | 11/2002 | Wenhua | |
| 2003/0081898 A1 * | 5/2003 | Tabuchi | G02B 6/12011 385/37 |
| 2009/0252457 A1 * | 10/2009 | Kim | G02B 6/12011 385/46 |
| 2014/0133817 A1 | 5/2014 | Lealman et al. | |
| 2015/0247974 A1 | 9/2015 | Yves et al. | |
| 2016/0103279 A1 | 4/2016 | Russell | |
| 2016/0131837 A1 | 5/2016 | Mahgerefteh et al. | |

OTHER PUBLICATIONS

International Search Report and Written Opinion dated Nov. 14, 2018, in related PCT Application No. PCT/US2018/045272.

* cited by examiner

ECHELLE GRATING MULTIPLEXER OR DEMULTIPLEXER

CROSS-REFERENCE TO RELATED APPLICATIONS

This patent application claims the benefit of and priority to U.S. Provisional Patent Application No. 62/540,968 filed Aug. 3, 2017, which is incorporated herein by reference in its entirety.

BACKGROUND

This disclosure generally relates to multiplexers and demultiplexers for optical communication.

In optical communication, multiplexing generally refers to methods for combining multiple input optical signals into a single output port. The multiplexed signal may then be transmitted over an optical link such as an optical fiber (or multiple optical fibers). Demultiplexing generally refers to methods for separating the multiplexed signal into multiple constituent optical signals exiting the output ports of the device. A device that performs the multiplexing is called a multiplexer (MUX), and a device that performs demultiplexing is called a demultiplexer (DEMUX or DMX). In some configurations, a device may perform both multiplexing and demultiplexing depending on the ports that are designated as input(s) or output(s).

The claimed subject matter is not limited to embodiments that solve any disadvantages or that operate only in environments such as those described above. This background is only provided to illustrate examples of where the present disclosure may be utilized.

DETAILED DESCRIPTION

Figure 1:
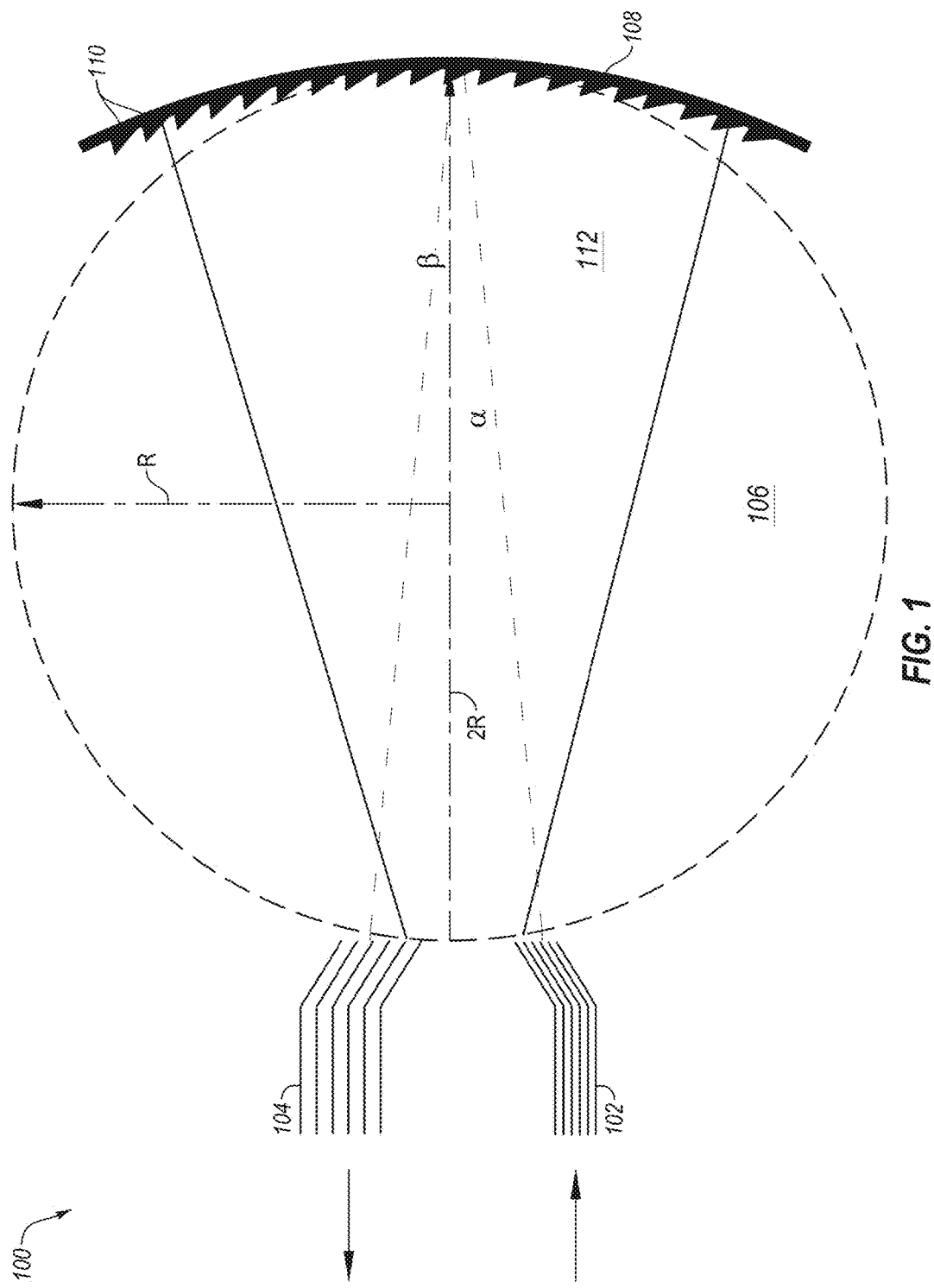
FIG. 1 is a schematic view of an example embodiment of an echelle grating.

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

This disclosure generally relates to multiplexers and demultiplexers for optical communication. Systems that implement multiplexing or demultiplexing may be used to increase the information-carrying capacity or bandwidth of data transmitted in an optical network. In some circumstances, multiplexing may be used to increase the bandwidth of optical networks without changing the optical links (e.g., optical fibers) connecting two locations. For example, a multiplexer and a demultiplexer may be added to an existing optical network used to increase the bandwidth transmitted through an existing optical link between two locations, without having to replace any optical fibers that have been installed.

Wavelength-division multiplexing (WDM) generally refers to methods and systems for multiplexing and/or demultiplexing optical signals with different wavelengths (e.g., different colors) of light, to transmit the information over a single optical fiber. Each separate wavelength of light may be referred to as a "channel" for transmitting optical signals. The different channels may be combined and transmitted over an optical fiber, the combined optical signal may be received at the other end of the optical fiber, and the different channels may be extracted. Generally, a WDM system includes multiple transmitters (e.g., lasers), each corresponding to one channel of optical signals. Each transmitter may generate optical signals including a specific wavelength or range of wavelengths that correspond to a specific channel. The WDM system also may include multiple receivers (e.g., photodiodes), each corresponding to one channel of optical signals. Each receiver may receive optical signals with a specific wavelength or range of wavelengths that correspond to a specific channel.

A WDM system also generally includes a wavelength filter. In some configurations, arrayed waveguide gratings (AWGs) or echelle gratings may be implemented as wavelength filters for multiplexing and/or demultiplexing optical signals in WDM systems. Both AWGs and echelle gratings are based on multi-path interference of light, but the implementation of the delays between the paths is different: in an AWG the different paths are individual waveguides arranged in an array, while in an echelle grating the light travels freely through an optically transmissive medium and is diffracted by a series of facets. In some circumstances, the optically transmissive medium of the echelle grating is referred to as a slab.

Multiplexers and/or demultiplexers implementing echelle gratings may include relatively smaller dimensions than other comparable optical devices, such as arrayed waveguide gratings (AWG). Additionally or alternatively, multiplexers and/or demultiplexers implementing echelle gratings may include simpler layouts when compared to other types of comparable optical devices.

In particular, echelle gratings typically implement a set of equally spaced delay lengths in a free propagation region using reflective facets. This means that the same area in an optically transmissive medium is used for both diffraction and refocusing. While this configuration may lead to a more efficient use of space, in some embodiments the position of the input and output waveguides may be restricted.

In some circumstances, WDM systems may be implemented using silicon photonics. Silicon photonics are optical systems that use silicon or similar materials as optically transmissive media. The silicon may be positioned on a layer of silica. Such configurations may be referred to as silicon on insulator (SOI) devices. In some circumstances, silicon photonics devices may be advantageous because the silicon may be patterned with sub-micrometer precision, into microphotonic components, and silicon photonic devices may be manufactured using existing semiconductor fabrication techniques. In addition, since silicon is already used as the substrate for many integrated circuits, it may be possible to create hybrid devices in which optical and electronic components are integrated onto a single microchip.

Although silicon photonics has gained increasing acceptance as the platform of photonic integration, WDM filters on silicon are relatively sensitive to temperature fluctuations due to the relatively high thermo-optic (TO) coefficient of silicon.

The present disclosure includes embodiments that facilitate addressing the thermal limitations of WDM filters on silicon. In particular, some of the disclosed embodiments implement silicon nitride (SiN) or similar materials to reduce thermo-optic effects and decrease optical nonlinearities. In some circumstances, such configurations may be implemented in WDM systems for better thermal and optical performance.

One example of hybrid devices that integrate optical and electronic components is a complementary metal-oxide-semiconductor (CMOS) integrated photonic. A CMOS integrated photonic combines CMOS manufacturing with optical components, such as silicon photonics devices. However, CMOS manufacturing techniques, and the resulting CMOS devices, may include various design limitations. For example, CMOS devices may include limitations on the size or density of components, which in turn may limit the size or density of optical components integrated therein. Aspects of the present disclosure include solutions for implementing optical components in CMOS compatible devices. For example, the disclosed embodiments include optical components with suitable sizes and dimensions to be implemented in CMOS compatible devices while retaining suitable optical and thermal characteristics.

In particular, aspects of this disclosure relate to implementing silicon nitride in submicron SOI platforms to improve active and passive functionalities for CMOS-compatible integrated photonics. Additionally or alternatively, the disclosed embodiments may facilitate decreasing or eliminating crosstalk in integrated photonics.

As mentioned, echelle gratings may be implemented as wavelength filters for multiplexing and/or demultiplexing optical signals in WDM systems. FIG. 1 is a schematic view of an example embodiment of an echelle grating 100. As illustrated the echelle grating 100 may include one or more input waveguides 102 and one or more output waveguides 104. For instance, if the echelle grating 100 is implemented as a DEMUX, it may include a single input waveguide 102 and multiple output waveguides 104. On the other hand, if the echelle grating 100 is implemented as a MUX, it may include multiple input waveguides 102 and a single output waveguide 104.

An exit from each input waveguide 102 may be referred to as an input port. An entrance to each output waveguide 104 may be referred to as an output port. The input waveguides 102 and the output waveguides 104, and more particularly the input ports and output ports, may be positioned around a Rowland circle 106. The Rowland circle 106 may include a radius, denoted at R. The echelle grating 100 includes a grating circle 108 with a radius twice as large as the radius of the Rowland circle 106. The radius of the grating circle 108 is denoted at 2R. Multiple facets 110 are positioned around the grating circle 108. A free propagation region (FPR) 112 extends between the output waveguides 102, the input waveguides 104, and the grating circle 108. In the illustrated configuration, the FPR 112 includes a silicon nitride slab, although other configurations may be implemented.

In the illustrated example, the echelle grating 100 is configured to demultiplex a multiplexed signal. Accordingly, a multiplexed signal is input at the input waveguides 102, the multiplexed signal is demultiplexed by the echelle grating 100 into multiple channels that make up the multiplexed signal, and the channels are then output at the output waveguides 104, e.g., one channel per output waveguide 104.

In more detail, the multiplexed signal may enter the FPR 112 from the input waveguide 102 and may propagate across the FPR 112 to the facets 110 on the grating circle 108. The multiplexed signal is diffracted by the facets 110 and angularly separated at each facet 110 into the channels, or optical signals at different wavelengths or ranges of wavelengths. Each of the output waveguides 104, and more particularly the output ports, is arranged at a location of constructive interference of a given channel and mode such that each of the channels may be output to a different one of the output waveguides 104. For instance, diffracted components from all the facets 110 that have a desired mode and a first wavelength or range of wavelengths of a first channel may constructively interfere at an output port of a first one of the output waveguides 104, diffracted components from all the facets 110 that have the desired mode and a second wavelength or range of wavelengths of a second channel may constructively interfere at an output port of a second one of the output waveguides 104, and so on.

If a higher order mode or modes of a given channel are excited, the higher order mode(s) may constructively interfere at different locations along the Rowland circle 106 than the desired mode, which can result in crosstalk. For instance, if a higher order mode of the first channel constructively interferes at or near the output port intended for the desired mode of the second channel, this may result in a crosstalk condition in which the higher order mode of the first channel combines with the desired mode of the second channel.

As mentioned above, the illustrated echelle grating 100 is configured to demultiplex a multiplexed signal. In other configurations, the echelle grating 100 may be configured to multiplex multiple optical signals or channels into a single multiplexed signal. In such configurations, multiple optical signals may be input from multiple input waveguides 102, the optical signals may be multiplexed by the echelle grating 100, and may then be output as a multiplexed signal at one output waveguide 104.

As mentioned, some of the disclosed embodiments implement silicon nitride in integrated photonics devices. For example, the FPR 112 of the echelle grating 100 of FIG. 1 may include a silicon nitride slab.

Figure 2A:
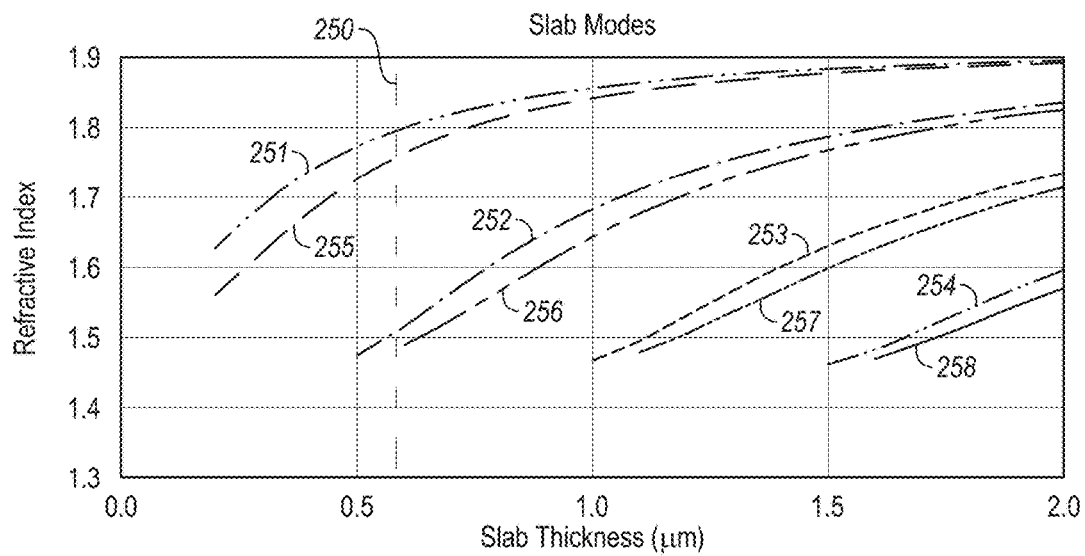
FIG. 2A is a graphical view that illustrates birefringence of a silicon nitride integrated photonics device.

FIG. 2A is a graphical view that illustrates birefringence of a silicon nitride integrated photonics device. Such a silicon nitride integrated photonics device may include or correspond to the echelle grating 100 or a portion thereof in FIG. 1. In more detail, FIG. 2A illustrates transverse-electric (TE) and transverse-magnetic (TM) slab modes for slab thickness in micrometers (μm) on the x-axis versus the refractive index on the y-axis. FIG. 2A also includes a dashed line 250 that represents silicon nitride slab thickness of 600 nanometers (nm) that corresponds to 0.6 μm on the x-axis. FIG. 2A depicts four TE modes 251, 252, 253, and 254 and four TM modes 255, 256, 257, and 258. As illustrated, a 600 nanometer silicon nitride slab supports two TE modes 251 and 252 and one TM mode 255.

Figure 2B:
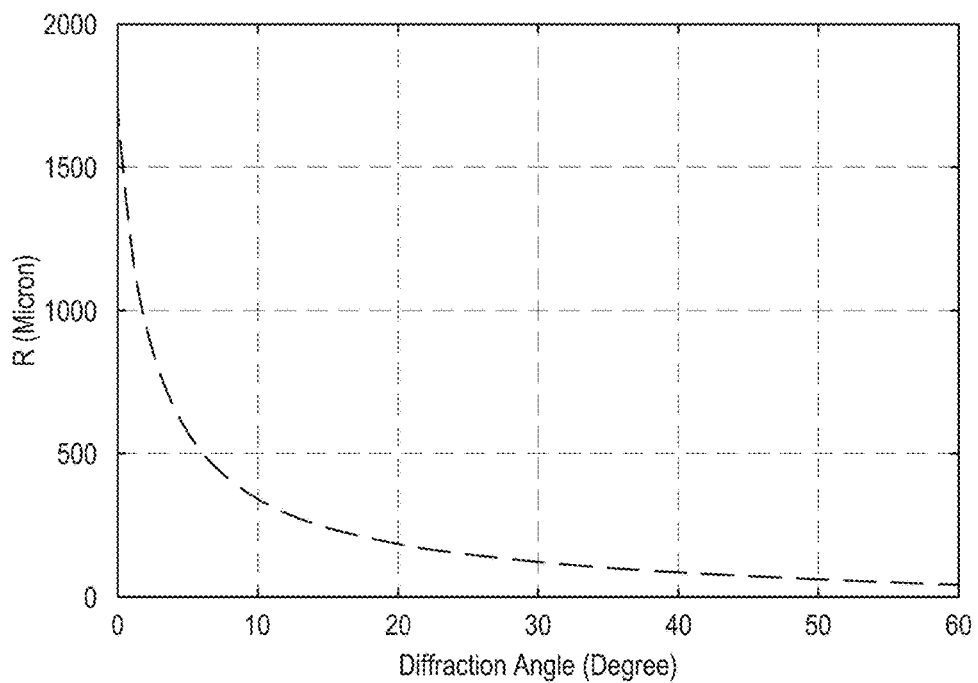
FIG. 2B is a graphical view that illustrates the relationship between radius of a Rowland circle versus diffraction angle.

FIG. 2B is a graphical view that illustrates the relationship between radius R of a Rowland circle versus diffraction angle. In FIG. 2B, the diffraction angle is expressed in degrees on the x-axis versus the radius R, which is expressed in μm. In FIG. 2B, the radius may correspond to the radius R of the Rowland circle 106 of FIG. 1; and the diffraction angle may correspond to the angle of tilt of the center position of output waveguides 104 from the normal direction of the grating curve 108.

In some circumstances, the relationship illustrated in FIG. 2B may be represented by the formula:

$$\lambda_0 - \lambda_k = \frac{(neff_0 - neff_k) \cdot \lambda_0 \cdot \sin\beta}{neff_0 \cdot (\sin\alpha + \sin\beta)}$$

In the above formula, $\beta$ is the diffraction angle, $\alpha$ is the incident angle, $\lambda_0$ is the wavelength of the fundamental slab mode, $\lambda_k$ is the wavelength of the $k_{th}$ higher order slab mode, nef $f_0$ is the effective index of the fundamental slab mode, and nef $f_k$ is the effective index of the $k_{th}$ higher order slab mode.

Accordingly, depending on the configurations of the input and output interface of a photonic device, such as the echelle grating 100 of FIG. 1, a silicon nitride slab may support higher order modes. In configurations where the facets 110 of the grating 108 are tilted from the vertical, these higher modes may be diffracted at different wavelengths causing cross-talk to the neighboring channels and/or insertion loss. Some previous configurations to address this problem have implemented a 0-degree or near 0-degree diffraction angle for the facets 110. Such configurations may avoid higher order modes that cause cross-talk by causing the higher order modes to diffract at the fundamental wavelength.

However, as illustrated in FIG. 2B, the radius R of the Rowland circle must be very large for the diffraction angle to be zero (0). In particular, in the illustrated configuration, the radius R must be in the range of 1000 to 2000 In some circumstances, implementing a Rowland circle with such dimensions in a CMOS-compatible device may be impractical because of the size and density limitations for CMOS devices. In particular, a Rowland circle with such dimensions may be too large to implement in a CMOS device because of the aforementioned size and density limitations. In order to facilitate compatibility with CMOS devices, it may be desirable to implement an echelle grating with smaller dimensions while suitably managing cross-talk.

Turning back to FIG. 2A, for relatively thinner silicon nitride slabs, such as the 600 nm silicon nitride slab represented by the dashed line, the refractive index between the fundamental mode and higher order modes may have a relatively large difference. For example, as illustrated in FIG. 2A, the 600 nm silicon nitride slab includes TE modes 251 and 252 that respectively have refractive indices of approximately 1.5 and 1.8, with a difference of approximately 0.3. In such configurations, the two TE modes 251 and 252 are relatively well-separated, and at least some of the embodiments described herein take advantage of this characteristic. In particular, the embodiments described herein may use the relatively large difference between the refractive indices of the fundamental mode and the higher order modes to diffract the higher order modes outside of the channel passbands for the individual channels of the echelle grating.

For example, embodiments include echelle gratings with a smaller Rowland circle radius and with larger input and/or output angles implemented to diffract the higher order modes outside of the passband of the echelle grating. Such configurations may be implemented in compact WDM devices with suitable optical and thermal characteristics. In particular, such configurations may result in compact devices that are CMOS compatible. Additionally or alternatively, such devices may exhibit suitable optical characteristics with relatively low or acceptable levels of cross talk.

Figure 2C:
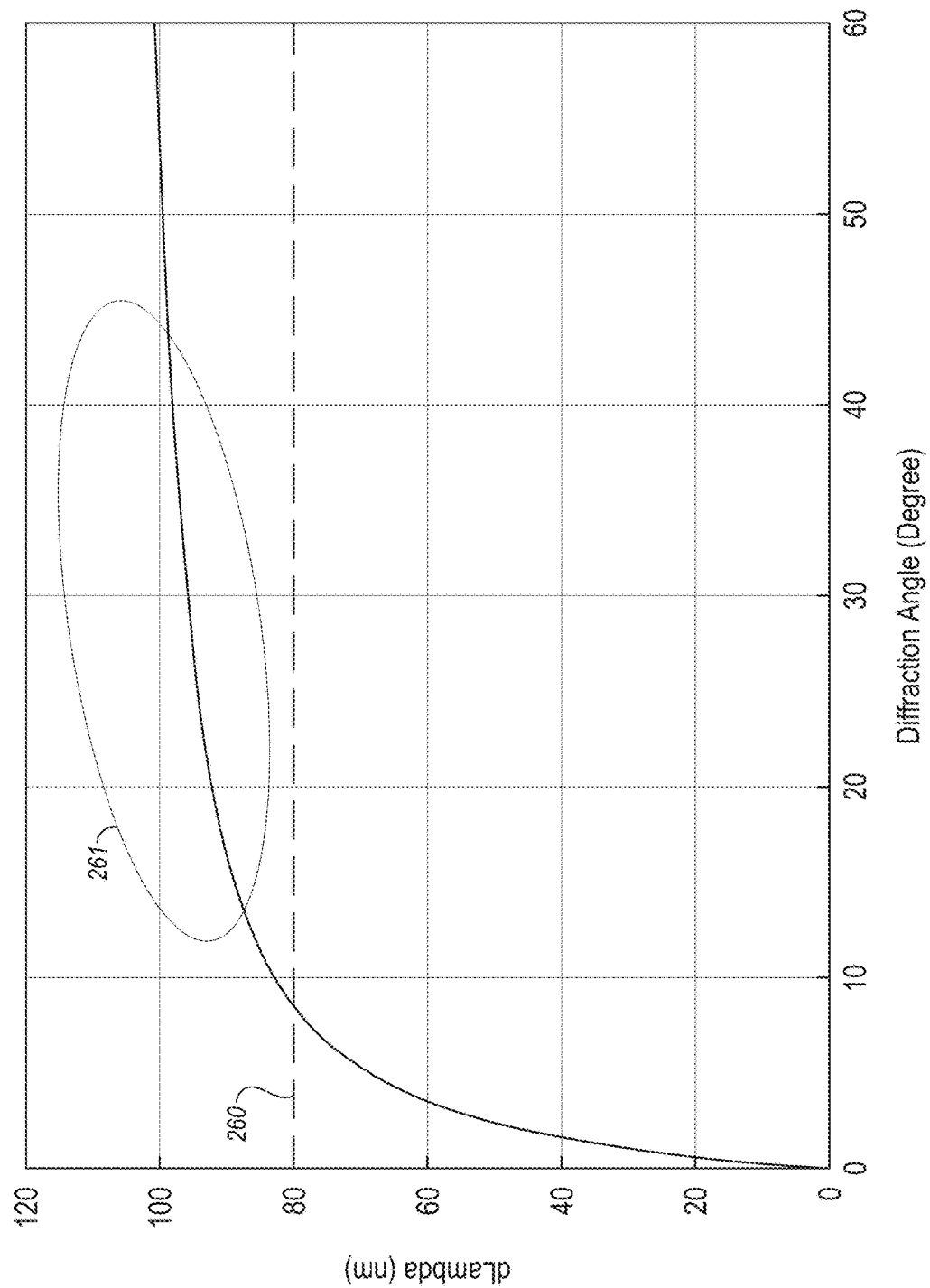
FIG. 2C is a graphical view that illustrates the diffraction angle of facets versus the difference between the fundamental mode and the higher order mode.

FIG. 2C is a graphical view that illustrates the diffraction angle of the facets versus the difference between the fundamental mode and the higher order mode. In particular, the diffraction angle is expressed in degrees on the x-axis versus the dLambda ($\Delta\lambda$), which represents the difference between the fundamental mode and the high order mode, expressed in nanometers (nm). FIG. 2C also includes a dashed line 260 which represents the total pass band, positioned at a $\Delta\lambda$ of 80 nanometers (nm). An oval 261 positioned above the total pass band encloses therein potential diffraction angles $\beta$ that may be implemented for the center output of an echelle grating, such as the output waveguides 104 of the echelle grating 100 of FIG. 1.

Due to the large effective index difference between slab modes, a relatively larger 4X, between the diffracted wavelengths may be implemented. In such configurations, higher order modes may be diffracted completely outside of the filter passband, and therefore, the non-verticality of the facets will not result in high cross-talk in any of the channels of the echelle grating. The potential diffraction angles enclosed by the oval in FIG. 2C may be suitable for implementation in configurations that may be compact enough to be implemented in CMOS compatible devices by virtue of their dimensions.

In some configurations, the diffraction angle may be selected to be between 15 and 40 degrees, or 10 and 50 degrees. This diffraction angle may be selected for the output waveguides. Such configurations may reduce cross-talk between different channels while maintaining a relatively compact design with dimensions suitable for use in CMOS-compatible devices.

Figure 3A:
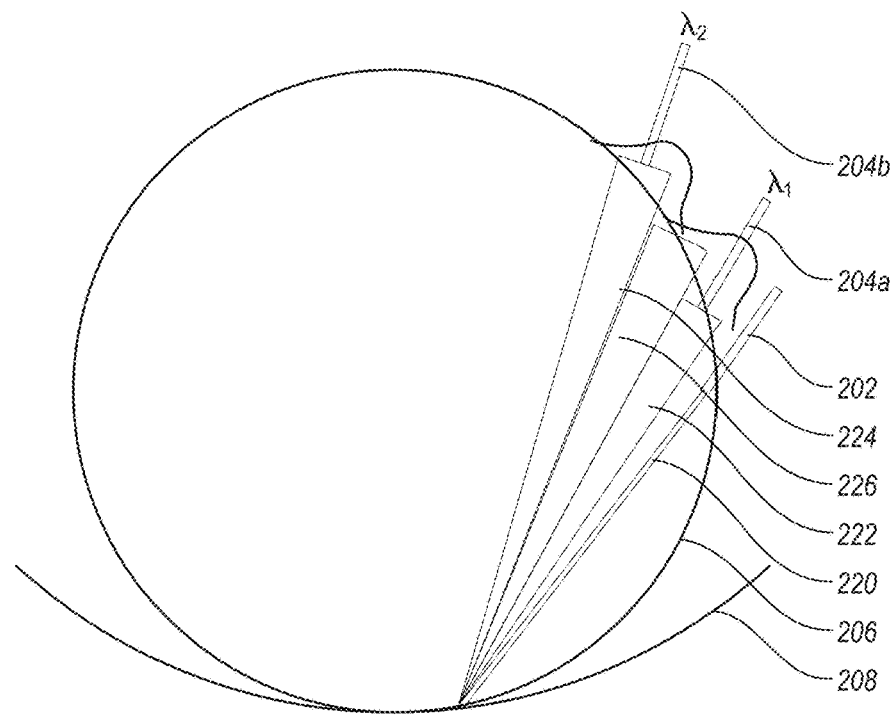
FIG. 3A is a schematic view of another example embodiment of an echelle grating.

FIG. 3A is a schematic view of another example embodiment of an echelle grating 200. As illustrated the echelle grating 200 includes an input waveguide 202 and output waveguides 204a and 204b. To illustrate the concepts described, only one input waveguide 202 and two output waveguides 204a, 204b are illustrated. However, the echelle grating 200 may include any suitable number of input and output waveguides. The input waveguide 202 and the output waveguides 204a, 204b, or more particularly a corresponding input port and output ports, may be positioned around a Rowland circle 206. The echelle grating 200 also includes a grating circle 208 with a radius twice as large as the radius of the Rowland circle 206. Although not shown, a plurality of facets may be positioned around the grating circle 208. In the illustrated example, the echelle grating 200 is configured to demultiplex a multiplexed signal 220 into multiple channels. However, in other configurations the echelle grating 200 may be configured to multiplex multiple channels into a multiplexed signal, in which case the echelle grating 200 may have multiple input waveguides and a single output waveguide.

The multiplexed signal 220 may travel from the input waveguide 202 through a free propagation region of the echelle grating 200 to the facets of the grating circle 208. The multiplexed signal 220 may be diffracted based on wavelength to angularly separate the channels that make up the multiplexed signal 220. As discussed above, the spectral components of each channel and mode may constructively interfere at corresponding output ports such that each channel is received into a different one of the output waveguides 204a and 204b. In the illustrated configuration, a wavelength or wavelength range of a channel that propagates in the output waveguide 204a is denoted as $\lambda_1$ while another wavelength or wavelength range of a channel that propagates in the output waveguide 204b is denoted as $\lambda_2$.

Figure 3B:
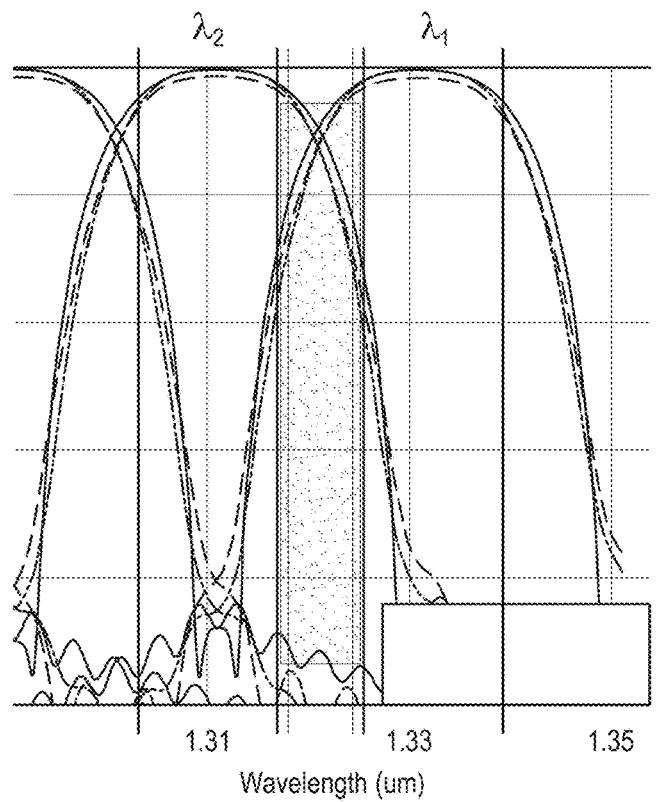
FIG. 3B is a graphical view that represents an example transmission spectrum of the echelle grating of FIG. 3A.

FIG. 3B is a graphical view that represents an example transmission spectrum of the echelle grating 200 of FIG. 3A. In particular, FIG. 3B illustrates the transmission spectrum of optical signals, including the range of wavelengths $\lambda_1$ and the range of wavelengths $\lambda_2$, received at the output waveguides 204a, 204b.

In some configurations, the multiplexed signal 220 that enters the echelle grating 200 from the input waveguide 202 is a single mode optical signal, while the channels that exit the echelle grating 200 through the output waveguides 204a, 204b are multimode signals. The input waveguide 202 may be single mode such that only single mode is excited in the slab mode of the Rowland circle 206, rather than higher order modes. Additionally or alternatively, the output waveguides 204a, 204b may be configured as multimode waveguides so that if there are any process variations, temperature change, or any shifts, the insertion loss will remain relatively low.

Since the echelle grating 200 is a diffraction grating, different wavelengths are diffracted to different positions around the Rowland circle 206, and different output waveguides are positioned to receive specific desired wavelengths of optical signals. As illustrated in FIG. 3A, the output waveguide 204a is positioned to receive an optical signal 222 having the wavelength or wavelength range $\lambda_1$ and the output waveguide 204b is positioned to receive an optical signal 224 having the wavelength or wavelength range $\lambda_2$.

However, undesired wavelengths or ranges of wavelengths of an optical or signals 226 may be positioned between the optical signal 222 and the optical signal 224. These undesired optical signals 226 may be caused by relatively weak mode confinement, which may be caused, for example, by relatively thin silicon nitride slab profiles.

Crosstalk may be caused when the undesired optical signals 226 are coupled into the output waveguides 204a, 204b. While increasing the width of the output waveguides 204a, 204b may increase bandwidth of the pass band, it may also increase crosstalk because the output waveguides 204a, 204b may optically couple with the undesired optical signals 226. Crosstalk may be reduced by increasing the radius of the Rowland circle 206, because this would increase the distance between the output waveguides 204a, 204b. However, this may undesirably increase the dimensions of the echelle grating 200, and potentially make the echelle grating 200 unsuitable for CMOS device configurations. For example, in some circumstances, one or more dimensions of the echelle grating 200 may be limited to 250 µm.

Accordingly, in some circumstances it may be desirable to eliminate or decrease crosstalk without increasing the dimensions of the echelle grating 200. Embodiments described herein may be implemented to reduce crosstalk in echelle grating devices without increasing the dimensions of the echelle grating devices.

Figure 4A:
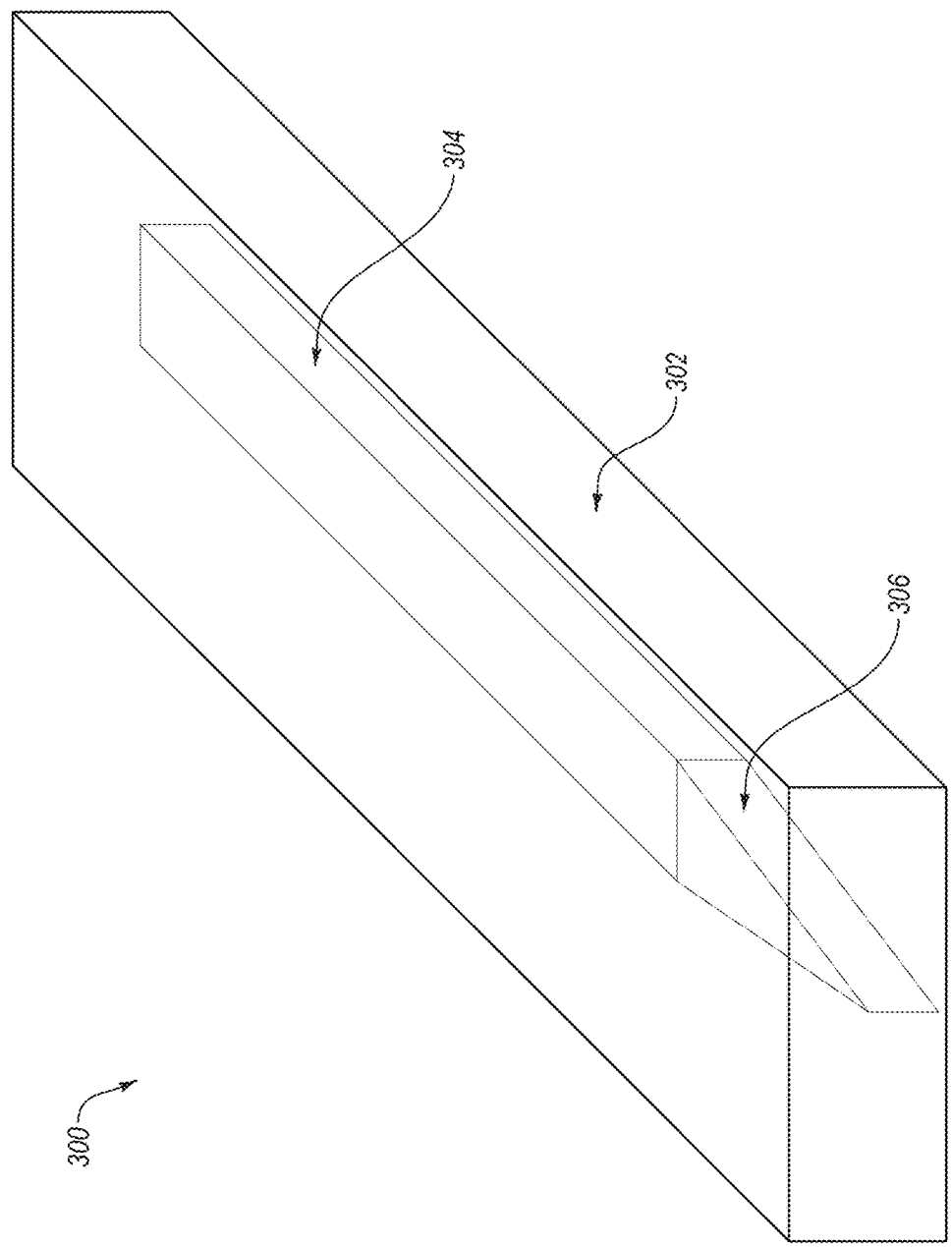
FIG. 4A is a perspective view that illustrates an example embodiment of a waveguide assembly.

FIG. 4A is a perspective view that illustrates an example embodiment of a waveguide assembly 300. As mentioned above, a relatively thin silicon nitride slab may result in optical signals with mode profiles with portions of large exponential tails (see, for example, undesired optical signals 226 in FIG. 3A). These undesired optical signals may optically couple with output waveguides for neighboring channels, resulting in crosstalk. As will be explained in further detail below, the waveguide assembly 300 decrease or eliminate crosstalk without increasing the radius of the Rowland circle or the dimensions of the Echelle grating.

In particular, the waveguide assembly 300 includes a silicon nitride waveguide 302, positioned above a silicon waveguide 304. In other embodiments, the silicon nitride waveguide 302 may be positioned below the silicon waveguide 304. In either case, the two waveguides 302, 304 may be aligned laterally, with one directly above the other. FIG. 4A illustrates only waveguide cores of the silicon nitride waveguide 302 and the silicon waveguide 304, and the cores may be surrounded in some embodiments by a cladding material, such as silicone dioxide, which is not shown in FIG. 4A but may nevertheless be present. The silicon waveguide 304 in this and other embodiments is an example of an auxiliary waveguide that may be used with a main or primary waveguide such as the silicon nitride waveguide 302 to increase mode confinement and reduce or eliminate crosstalk. Main or primary waveguides and auxiliary waveguides with different materials or material compositions may be implemented in other embodiments.

The combination of the silicon nitride waveguide 302 and the silicon waveguide 304 may provide relatively higher lateral mode confinement, and thus may decrease crosstalk caused by undesired wavelengths of optical signals being received at the output.

As illustrated, the silicon waveguide 304 may include a tapered portion 306. In the illustrated configuration, the tapered portion 306 is included on a proximate portion of the silicon waveguide 304. As illustrated for example in FIG. 4B, in some configurations, a waveguide assembly 309 may include tapered portions on both the proximate portion and a distal portion of the silicon waveguide 304. In such configurations, the distal portion of the silicon waveguide 304 may include a tapered portion 308, as well as the tapered portion 306. The tapered portions 306, 208 may facilitate in decreasing optical loss at the transitions of the waveguide assembly 300.

In the illustrated configuration, the silicon nitride waveguide 302 includes a first effective index, and the silicon waveguide 304 includes a second effective index. The effective index of the silicon is higher than the effective index of the silicon nitride, which facilitates in increasing the mode confinement of the channels of the waveguide configuration 300, and thereby decreasing crosstalk.

Although silicon nitride and silicon are used in the examples described herein, the concepts described may be applied to any suitable optically transmissive waveguide materials with different effective indices.

Figure 4B:
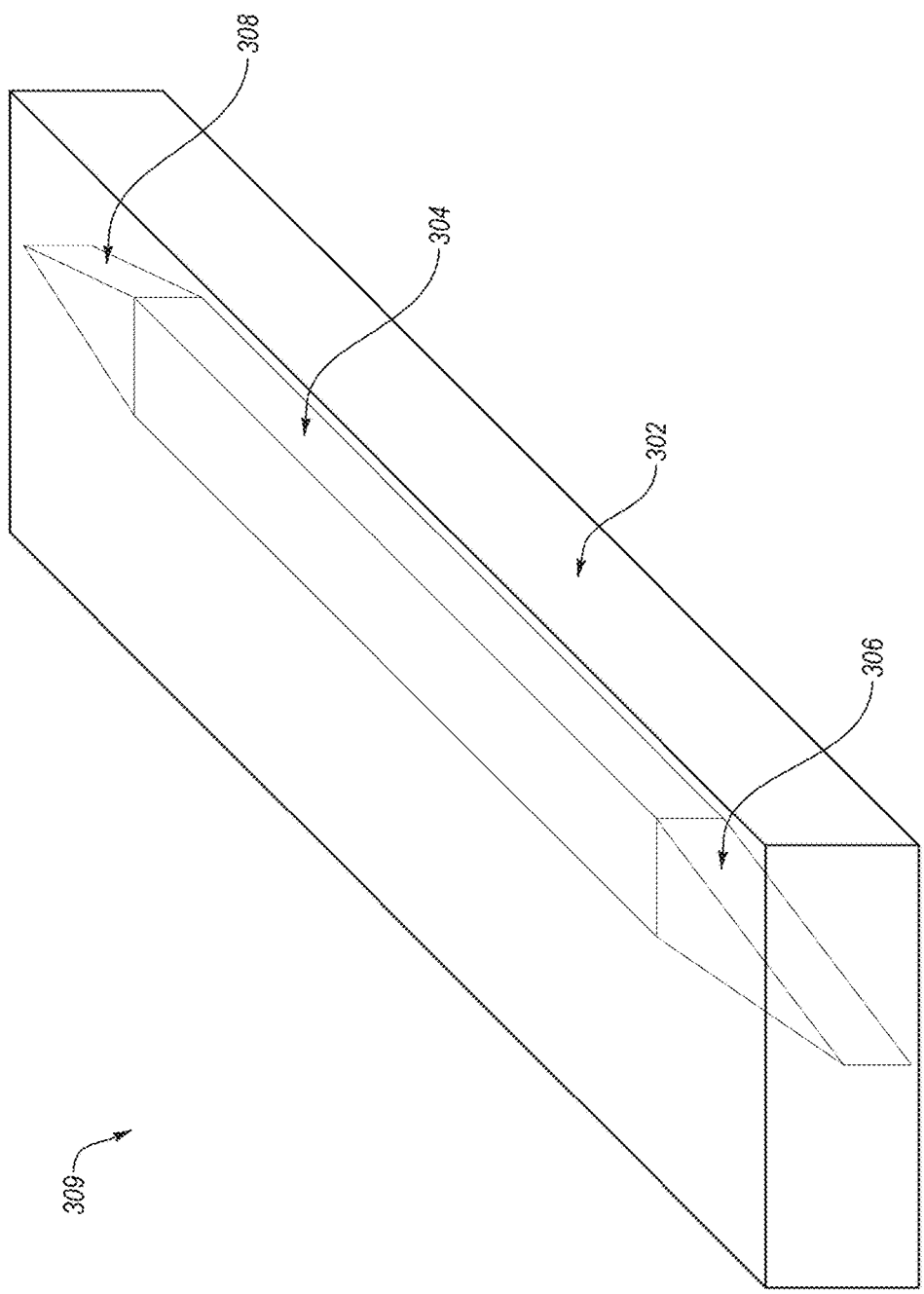
FIG. 4B is a perspective view that illustrates another example embodiment of a waveguide.
Figure 4C:
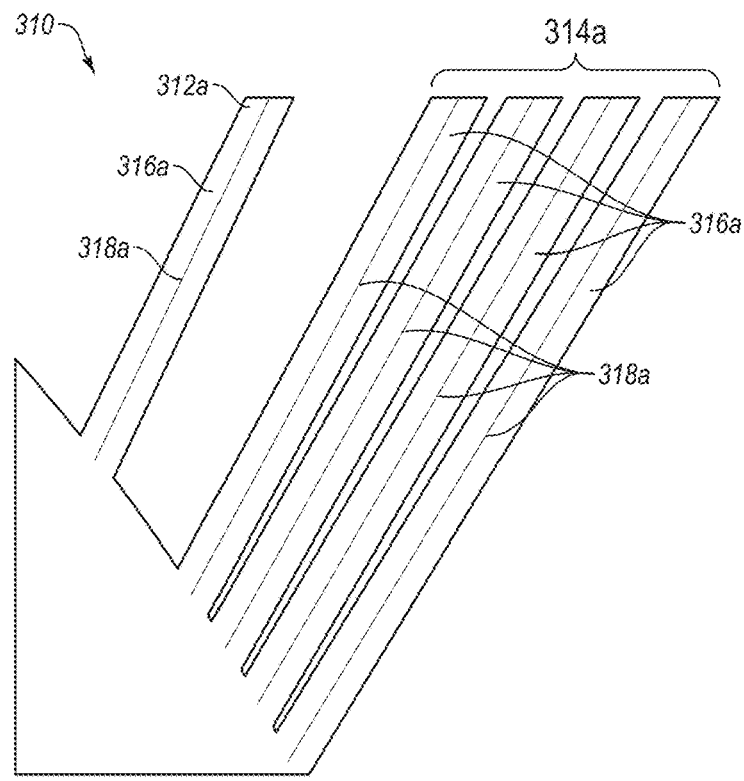
FIG. 4C is a schematic view that illustrates an example embodiment of a waveguide assembly.

FIG. 4C is a schematic view that illustrates an example embodiment of a waveguide assembly 310 of an echelle grating that may implement the waveguide assembly 300 of FIG. 4A. As illustrated, the waveguide assembly 310 includes an input waveguide 312a and multiple output waveguides 314a. The input waveguide 312a and/or the output waveguides 314a may each include a silicon nitride waveguide 316a, and a silicon waveguide 318a positioned above or below the silicon nitride waveguide 316a as discussed with respect to FIG. 4A.

Figure 4D:
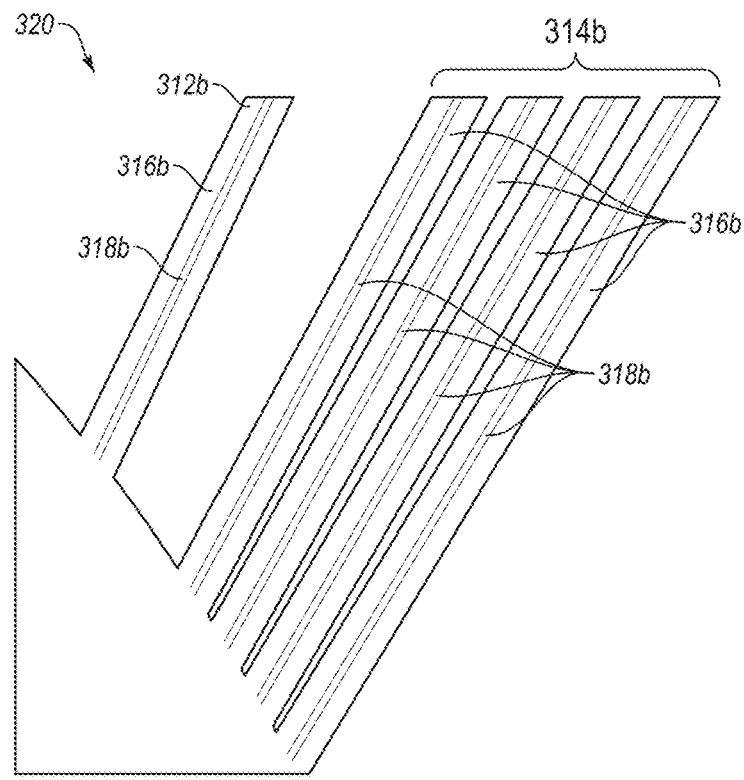
FIG. 4D is a schematic view that illustrates another example embodiment of a waveguide assembly.

FIG. 4D is a schematic view that illustrates another example embodiment of a waveguide assembly 320 of an echelle grating that may implement the waveguide assembly 300 of FIG. 4A. As illustrated, the waveguide assembly 320 includes an input waveguide 312b and multiple output waveguides 314b. The input waveguide 312b and/or the output waveguides 314b may each include a silicon nitride waveguide 316b, and two or more silicon waveguides 318b positioned above or below the silicon nitride waveguide 316b.

In some configurations, both the input waveguides 312a or 312b and the output waveguides 314a or 314b of FIGS. 4B and 4C may include the waveguide assemblies 300, 310, and/or 320 described above with silicon nitride and silicon (or other suitable optically transmissive materials with different effective indices). In such configurations, the input and output waveguides may include similar or identical optical characteristics to reduce or eliminate insertion loss in WDM devices.

In FIG. 4C, the waveguide assembly 310 includes a single silicon waveguide 318a for each silicon nitride waveguide 316a, a similar arrangement of which is illustrated in FIG. 4A. In FIG. 4D, the waveguide assembly 320 includes two silicon waveguides 318b for each silicon nitride waveguide 316b. Both configurations may reduce or eliminate the crosstalk while maintaining mode confinement in the silicon nitride waveguides 316a and/or 316b. In particular, the hybrid silicon nitride with silicon waveguide configurations illustrated in FIGS. 4A-4D may provide improved lateral mode confinement, by changing the mode profile, as will be discussed in further detail below with respect to FIGS. 5A-5F.

Figure 5A:
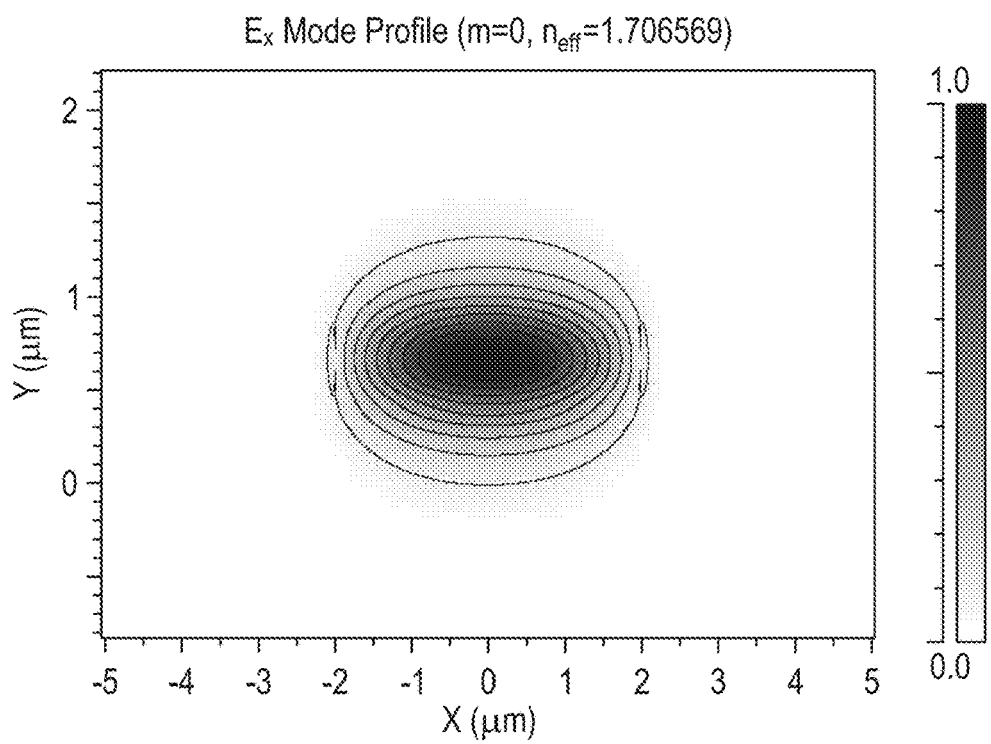
FIGS. 5A-5F are graphical views that illustrate the mode profiles of various waveguide assemblies.
Figure 5B:
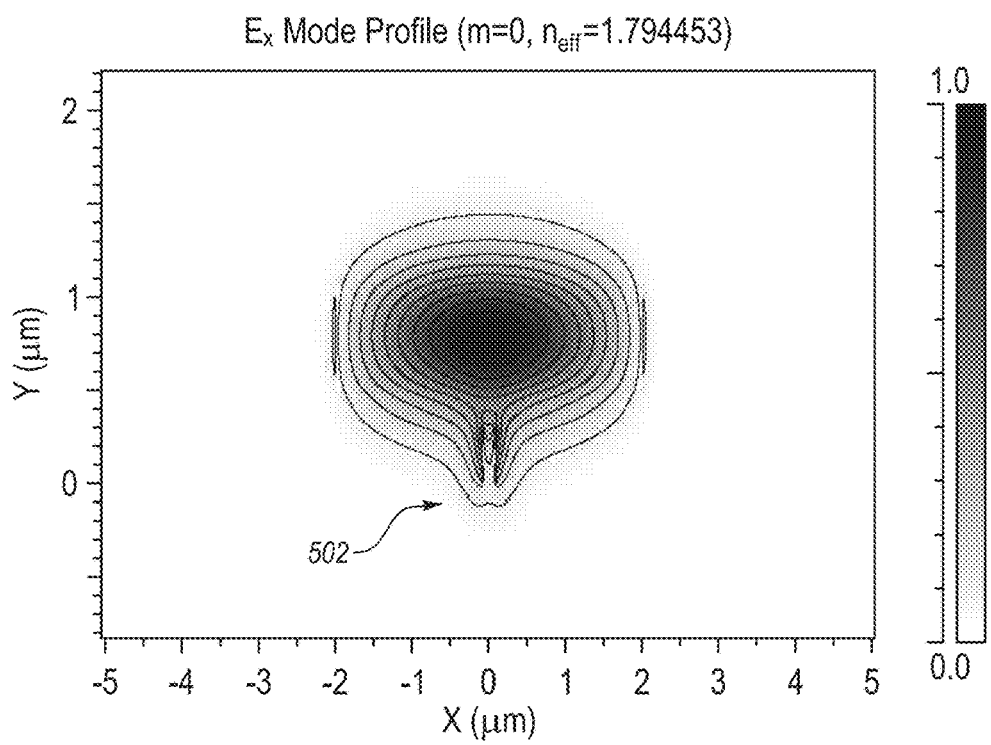

FIGS. 5A-5F are graphical views that illustrate the mode profiles of various waveguide assemblies. FIG. 5A illustrates the mode profile of a waveguide assembly including a silicon nitride waveguide without an underlying or overlying silicon waveguide. FIG. 5B illustrates the mode profile of a waveguide assembly including a silicon nitride waveguide with an underlying or overlying silicon waveguide, such as the waveguide assemblies 300 and 310 of FIGS. 4A and 4B. The waveguide assemblies shown in FIGS. 5A and 5B support one TE mode, although other configurations may be implemented. With attention to FIGS. 5A and 5B, the effect of the silicon in the waveguide assembly will be explained in further detail.

In the waveguide assembly of FIG. 5A, a silicon nitride waveguide may have relatively weak mode confinement, and exponential tails may cause crosstalk when the waveguide core is not wide enough. As shown in FIG. 5B, the silicon waveguide extends the mode profile in a vertical direction (y-direction) because the silicon has a higher index of refraction than the silicon nitride. In effect, the silicon pulls down the mode profile in the vertical direction, for example, in the position denoted at 502. This may also narrow the mode profile in a lateral direction (x-direction), which may improve mode confinement. Additionally or alternatively, this configuration may reduce or eliminate horizontal exponential tails that may otherwise optically couple with neighboring channels (e.g., neighboring waveguides) if not reduced or eliminated. The reduction or elimination of the horizontal exponential tails may in turn reduce or eliminate crosstalk. Accordingly, FIGS. 5A and 5B illustrate a manner in which the hybrid silicon nitride with silicon waveguide assemblies of FIGS. 4A and 4B may provide relatively higher lateral mode confinement and smaller exponential tails, by adjusting the mode profile of the optical signals in a vertical direction.

In some configurations the silicon nitride waveguide may include a dimension, such as a width, between 500 nanometers and 3000 nanometers. In some configurations, the silicon waveguide beneath or above the silicon nitride waveguide is sufficiently large to adjust the mode in a vertical direction and horizontally confine the mode. However, in such configurations, the silicon waveguide beneath or above the silicon nitride waveguide may not be so large that the optical signals travel through the silicon, in effect pulling the optical mode into the silicon. For example, in some configurations the silicon waveguide may include a dimension, e.g., a width, between 120 nanometers and 200 nanometers; or 150 nanometers and 200 nanometers.

Figure 5C:
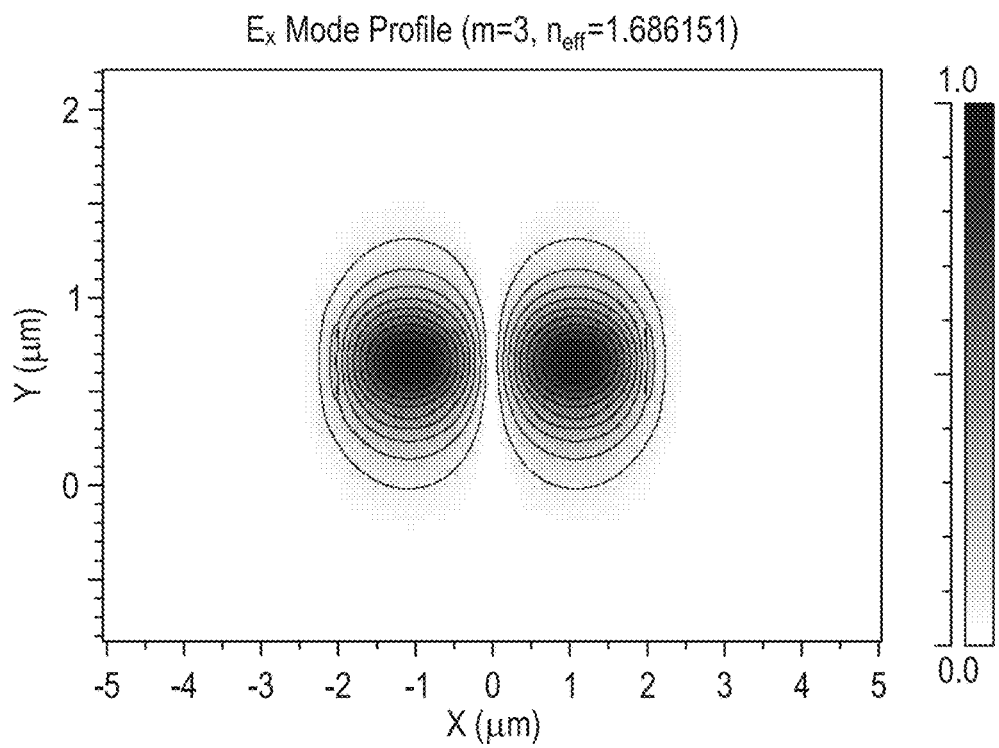
Figure 5D:
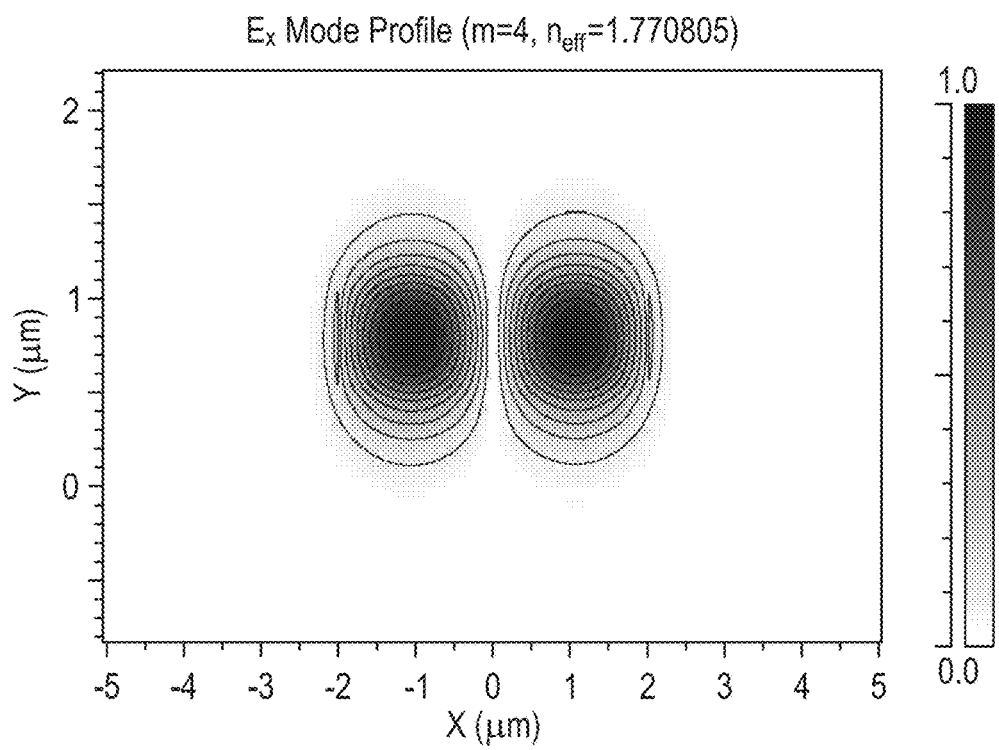
Figure 5E:
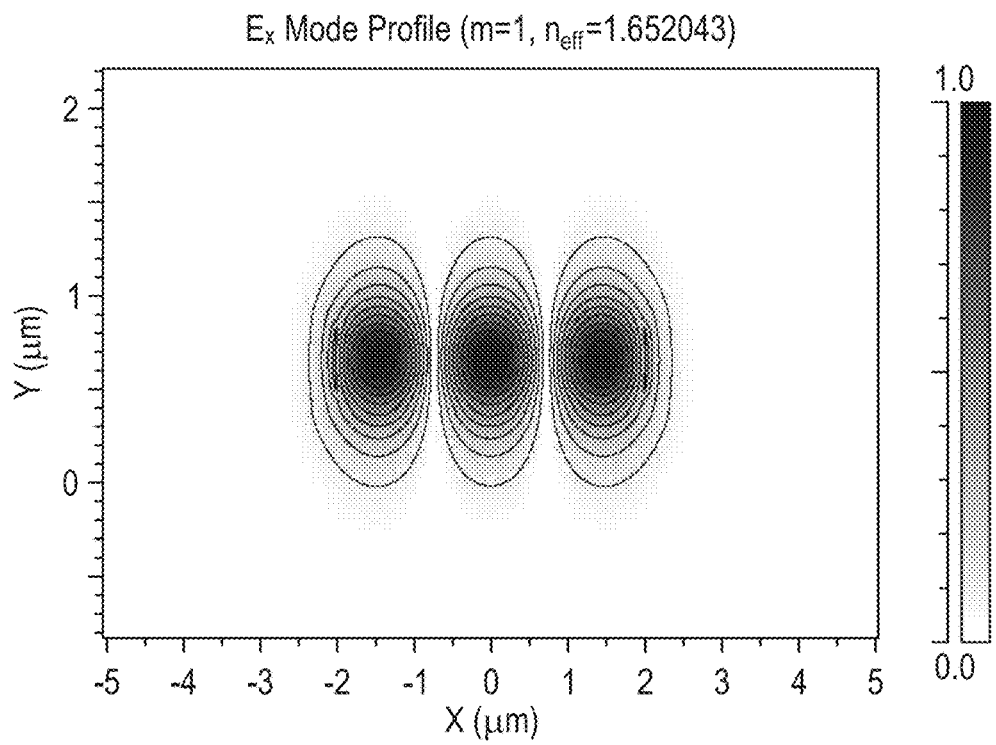
Figure 5F:
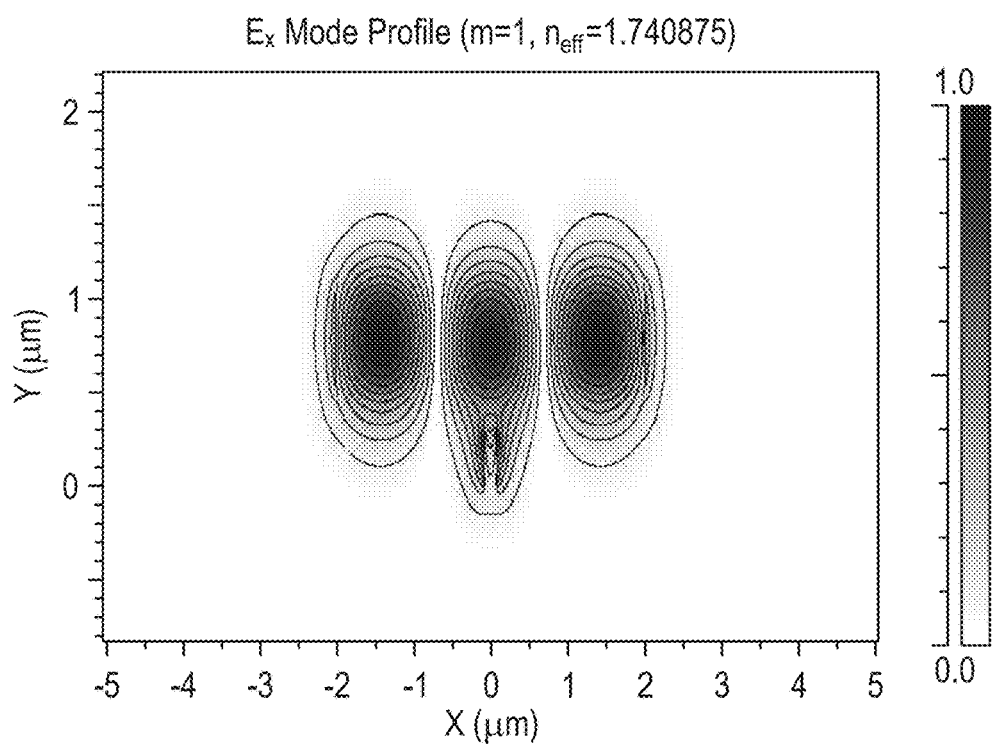

In some configurations, output waveguides are designed to support multiple waveguide modes to create a broad-band spectrum, so that if there are any process variations, temperature change, or any shifts, the insertion loss will remain relatively low. FIG. 5C illustrates the mode profile of a waveguide assembly supporting $2^{nd}$ order TE modes including a silicon nitride waveguide without an underlying or overlying silicon waveguide. FIG. 5D illustrates the mode profile of a waveguide assembly supporting $2^{nd}$ order TE modes including a silicon nitride waveguide with an underlying or overlying silicon waveguide. FIG. 5E illustrates the mode profile of a waveguide assembly supporting $3^{rd}$ order TE modes including a silicon nitride waveguide without an underlying or overlying silicon waveguide. FIG. 5F illustrates the mode profile of a waveguide assembly supporting $3^{rd}$ order TE modes including a silicon nitride waveguide with an underlying or overlying silicon waveguide. As illustrated in FIGS. 5C-5F, the waveguide assemblies with a silicon nitride waveguide including an underlying or overlying silicon waveguide may improve the mode profiles for any suitable number of modes by improving mode confinement and thereby reducing crosstalk.

The embodiments described above may address the thermal limitations of WDM filters by implementing silicon nitride or similar materials to reduce thermo-optic effects and decrease optical nonlinearities. Additionally or alternatively, the embodiments described include WDM filters with suitable sizes and dimensions to be implemented in CMOS compatible devices while retaining suitable optical and thermal characteristics. Some embodiments implement silicon nitride in submicron SOI platforms to improve active and passive functionalities for CMOS-compatible integrated photonics. Furthermore, the disclosed embodiments may decrease or eliminate crosstalk in integrated photonics.

In one example embodiment, an integrated silicon photonic wavelength division demultiplexer may include an input waveguide, an input port, a plurality of output waveguides, a plurality of output ports, a first auxiliary waveguide, and a plurality of auxiliary waveguides. The input waveguide may be formed in a first layer and may have a first effective index n1. The input port may be optically coupled to the input waveguide. The plurality of output waveguides may be formed in the first layer and may have the first effective index n1. Each of the output ports may be optically coupled to a corresponding output waveguide of the plurality of output waveguides. The first auxiliary waveguide may be formed in a second layer below the input waveguide in the first layer. The first auxiliary waveguide may have a second effective index n2 and may have two tapered ends. The plurality of auxiliary waveguides may be formed in the second layer below the plurality of output waveguides in the first layer. Each of the plurality of auxiliary waveguides may have the second effective index n2 and may have a flat end and a tapered end. In some configurations n2 may be higher than n1.

In some configurations, n2 being higher than n1 may increase confinement of the input and output waveguides.

Additionally or alternatively, n2 being higher than n1 may reduce the crosstalk between output channels of the plurality of output ports.

In some embodiments, the first layer may include silicon nitride (SiN) and the second layer may include silicon (Si). In one example, the first layer may consist of silicon nitride (SiN) and the second layer may consist of silicon (Si). The first layer may include a dimension between 500 nanometers (nm) and 3000 nm. The second layer may include a dimension between 150 nanometers (nm) and 200 nm. The wavelength division multiplexer may be an Echelle grating or an Arrayed Waveguide Grating. A diffraction angle of the input waveguide(s) or the output waveguide(s) may be between 15 and 40 degrees.

In another example embodiment, an integrated silicon photonic wavelength division demultiplexer may include a first layer having a first effective index, n1; an input port optically coupled to an input waveguide; a plurality of output ports, each of the output ports optically coupled to a corresponding output waveguide in the first layer and having the first effective index n1; and a first pair of auxiliary waveguides formed in a second layer below the input waveguide in the first layer, the pair of auxiliary waveguides having a second effective index n2 and having two tapered ends. In some configurations, n2 may be higher than n1.

In some embodiments, the integrated silicon photonic wavelength division demultiplexer may include a plurality of pairs of auxiliary waveguides in the second layer. Each of the pairs of auxiliary waveguides may be positioned below a corresponding output waveguide in the first layer. Each of the pairs of auxiliary waveguides may have the second effective index n2, and two tapered ends. In some aspects, n2 may be higher than n1 such that the confinement of the input and output waveguides may be increased, or such that crosstalk may be reduced between output channels of the plurality of output ports.

In some configurations, the wavelength division multiplexer may be an Echelle grating, the input port may be located at an angular position on a Rowland circle, the output ports may be located at angular positions on the Rowland Circle; and/or the angular position of the output ports may be chosen to be between a lower bound and an upper bound value such that $\lambda_0 - \lambda_k > N \times \Delta\lambda$ for all higher order modes k. A diffraction angle of the input waveguide(s) or the output waveguide(s) may be between 15 and 40 degrees.

In another example embodiment, an integrated silicon photonic wavelength division demultiplexer may include a plurality of input waveguide formed in a first layer and having a first effective index n1; a plurality of input ports, each of the input ports may be optically coupled to a corresponding input waveguide of the plurality of input waveguides; an output waveguide formed in the first layer and having the first effective index n1; an output port, wherein the output port may be optically coupled to the output waveguide; and a first auxiliary waveguide formed in a second layer below the output waveguide in the first layer, the first auxiliary waveguide having a second effective index n2 and having two tapered ends. In some configurations, n2 may be higher than n1.

The integrated silicon photonic wavelength division demultiplexer may include a plurality of auxiliary waveguides formed in the second layer below the plurality of input waveguides in the first layer, each of the plurality of auxiliary waveguides may have the second effective index n2 and two tapered ends.

The terms and words used in the above description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. An integrated silicon photonic wavelength division demultiplexer comprising:
   an input waveguide formed in a first layer and having a first effective index n1;
   an input port, wherein the input port is optically coupled to the input waveguide;
   a plurality of output waveguides formed in the first layer and having the first effective index n1;
   a plurality of output ports, wherein each of the output ports is optically coupled to a corresponding output waveguide of the plurality of output waveguides;
   a first auxiliary waveguide formed in a second layer positioned against and directly beneath the input waveguide in the first layer, the first auxiliary waveguide having a second effective index n2 and having two tapered ends; and
   a plurality of auxiliary waveguides formed in the second layer below the plurality of output waveguides in the first layer, each of the plurality of auxiliary waveguides having the second effective index n2 and having a flat end and a tapered end;
   wherein n2 is higher than n1.

2. The integrated silicon photonic wavelength division demultiplexer of claim 1, wherein n2 being higher than n1 increases confinement of the input and output waveguides.

3. The integrated silicon photonic wavelength division demultiplexer of claim 1, wherein n2 being higher than n1 reduces crosstalk between output channels of the plurality of output ports.

4. The integrated silicon photonic wavelength division demultiplexer of claim 1, wherein the first layer includes silicon nitride (SiN) and the second layer includes silicon (Si).

5. The integrated silicon photonic wavelength division demultiplexer of claim 1, wherein the first layer consists of silicon nitride (SiN) and the second layer consists of silicon (Si).

6. The integrated silicon photonic wavelength division demultiplexer of claim 1, wherein the first layer includes a dimension between 500 nanometers (nm) and 3000 nm.

7. The integrated silicon photonic wavelength division demultiplexer of claim 1, wherein the second layer includes a dimension between 150 nanometers (nm) and 200 nm.

8. The integrated silicon photonic wavelength division demultiplexer of claim 1, wherein the wavelength division multiplexer is an Echelle grating.

9. The integrated silicon photonic wavelength division demultiplexer of claim 1, wherein the wavelength division multiplexer is an Arrayed Waveguide Grating.

10. The integrated silicon photonic wavelength division demultiplexer of claim 1, wherein a diffraction angle of the input waveguide is between 15 and 40 degrees.

11. The integrated silicon photonic wavelength division demultiplexer of claim 1, wherein a diffraction angle of the output waveguides is between 15 and 40 degrees.

12. An integrated silicon photonic wavelength division demultiplexer comprising:
   a first layer having a first effective index, n1, an input port, the input port optically coupled to an input waveguide;
   a plurality of output ports, each of the output ports optically coupled to a corresponding output waveguide in the first layer and having the first effective index n1; and
   a first pair of auxiliary waveguides formed in a second layer positioned against and directly beneath the input waveguide in the first layer, the pair of auxiliary waveguides having a second effective index n2 and having two tapered ends;
   wherein n2 is higher than n1.

13. The integrated silicon photonic wavelength division demultiplexer of claim 12, further comprising a plurality of pairs of auxiliary waveguides in the second layer, each of the pairs of auxiliary waveguides positioned below a corresponding output waveguide in the first layer, and each of the pairs of auxiliary waveguides having the second effective index n2, and having two tapered ends.

14. The integrated silicon photonic wavelength division demultiplexer of claim 12, wherein n2 is higher than n1 such that confinement of the input and output waveguides is increased.

15. The integrated silicon photonic wavelength division demultiplexer of claim 12, wherein n2 is higher than n1 such that crosstalk is reduced between output channels of the plurality of output ports.

16. The integrated silicon photonic wavelength division demultiplexer of claim 12, wherein:
   the wavelength division multiplexer is an Echelle grating;
   the input port is located at an angular position on a Rowland circle;
   the output ports are located at angular positions on the Rowland Circle; and
   the angular position of the output ports is chosen to be between a lower bound and an upper bound value such that $\lambda_0 - \lambda_k > N \times \Delta\lambda$, for all higher order modes k.

17. The integrated silicon photonic wavelength division demultiplexer of claim 12, wherein a diffraction angle of the input waveguide is between 15 and 40 degrees.

18. The integrated silicon photonic wavelength division demultiplexer of claim 12, wherein a diffraction angle of the output waveguides is between 15 and 40 degrees.

19. An integrated silicon photonic wavelength division demultiplexer comprising:
   a plurality of input waveguides formed in a first layer and having a first effective index n1;
   a plurality of input ports, wherein each of the input ports is optically coupled to a corresponding input waveguide of the plurality of input waveguides;
   an output waveguide formed in the first layer and having the first effective index n1;
   an output port, wherein the output port is optically coupled to the output waveguide; and
   a first auxiliary waveguide formed in a second layer positioned against and directly beneath the output waveguide in the first layer, the first auxiliary waveguide having a second effective index n2 and having two tapered ends;
   wherein n2 is higher than n1.

20. The integrated silicon photonic wavelength division demultiplexer of claim 19, further comprising a plurality of auxiliary waveguides formed in the second layer below the plurality of input waveguides in the first layer, each of the plurality of auxiliary waveguides having the second effective index n2 and having two tapered ends.

21. The integrated silicon photonic wavelength division demultiplexer of claim 1, wherein the plurality of auxiliary waveguides are positioned against and directly beneath a corresponding one of the plurality of output waveguides.

22. An integrated silicon photonic wavelength division demultiplexer comprising:
   an input waveguide formed in a first layer and having a first effective index n1;
   an input port, wherein the input port is optically coupled to the input waveguide;
   a plurality of output waveguides formed in the first layer and having the first effective index n1;
   a plurality of output ports, wherein each of the output ports is optically coupled to a corresponding output waveguide of the plurality of output waveguides; and
   a plurality of auxiliary waveguides formed in a second layer positioned against and directly beneath each of the plurality of output waveguides in the first layer, each of the plurality of auxiliary waveguides having a second effective index n2 and having a flat end and a tapered end;
   wherein n2 is higher than n1.

* * * * *